US006633667B1

(12) United States Patent
Matsuoka

(10) Patent No.: US 6,633,667 B1
(45) Date of Patent: Oct. 14, 2003

(54) IMAGE PROCESSING APPARATUS AND METHOD

(75) Inventor: Hirochika Matsuoka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/420,778

(22) Filed: Oct. 19, 1999

(30) Foreign Application Priority Data

Oct. 19, 1998 (JP) ............................................. 10-297287
Sep. 8, 1999 (JP) ............................................. 11-254264

(51) Int. Cl.⁷ ................................................. G06T 7/00
(52) U.S. Cl. ...................................................... 382/162
(58) Field of Search ................................. 382/162, 167, 382/166; 345/427, 603, 604; 358/518, 523; 355/38

(56) References Cited

U.S. PATENT DOCUMENTS

| 4,929,978 | A | * | 5/1990 | Kanamori et al. | ............. | 355/38 |
| 5,835,624 | A | * | 11/1998 | Ueda et al. | ................. | 382/162 |
| 6,014,457 | A | * | 1/2000 | Kubo et al. | ................. | 382/162 |
| 6,044,172 | A | * | 3/2000 | Allen | ........................ | 382/166 |
| 6,088,475 | A | * | 7/2000 | Nagashima et al. | ........ | 382/162 |
| 6,310,969 | B1 | * | 10/2001 | Kim et al. | .................. | 382/162 |

OTHER PUBLICATIONS

U.S. patent application Ser. No. 09/467,984, filed Dec. 21, 1999.

* cited by examiner

*Primary Examiner*—Jon Chang
*Assistant Examiner*—Brian Q Le
(74) *Attorney, Agent, or Firm*—Fitzpatrick, Cella, Harper & Scinto

(57) ABSTRACT

A process that prepares inverse conversion data in advance, and inversely converts a signal in a given color space into that in an original color space suffers conversion accuracy variations depending on the spatial intervals of color signals upon preparing the inverse conversion data, requires high cost for inverse conversion in terms of time, resulting in poor efficiency. When an input signal in the Lab color space is converted into an output signal in the RGB color space, a color signal converter (102) converts an input signal in the RGB color space into a signal in the Lab color space. A potential calculator (103) extracts the difference between the input signal and the color signal output from the color signal converter (102). A minimal potential search unit 104 searches for a signal to be supplied to the color signal converter (102), which makes the extracted difference minimal, and outputs the search result as a color signal in the RGB color space, i.e., the conversion result.

21 Claims, 17 Drawing Sheets

FIG. 9

SET PATCH IMAGE ON SCANNER

FIG. 10

DESIGNATE COLOR ACCURACY

☑ PROCESSING
   SPEED PRIORITY
☐ PROCESSING
   ACCURACY PRIORITY

FIG. 12

| USER DESIGNATION RESULT | MULTIPLEX/ DEMULTIPLEX SIGNAL |
|---|---|
| PROCESSING SPEED PRIORITY | a |
| PROCESSING ACCURACY PRIORITY | b |

FIG. 13

| MULTIPLEX SIGNAL | MULTIPLEXED OUTPUT |
|---|---|
| a | OUTPUT a |
| b | OUTPUT b |

FIG. 14

| DEMULTIPLEX SIGNAL | DEMULTIPLEXED INPUT |
|---|---|
| a | INPUT a |
| b | INPUT b |

FIG. 17

DESIGNATE IMPORTANT COLOR

|  | L* | a* | b* |
|---|---|---|---|
| CENTRAL VALUE OF IMPORTANT COLOR | ☐ | ☐ | ☐ |

DESIGNATE NEIGHBORING RANGE    ΔE= ☐

[ END ]　　　　[ ADD ]

FIG. 19

| CONDITIONAL FORMULA | MULTIPLEX/ DEMULTIPLEX SIGNAL |
|---|---|
| $\Pi\,(\Delta E > \Delta E_{thi})$ | a |
| $\Sigma\,(\Delta E \leq \Delta E_{thi})$ | b |

WHERE $\Delta E = \sqrt{(L-L_i)^2 + (a-a_i)^2 + (b-b_i)^2}$, $L_i$, $a_i$, AND $b_i$ ARE CENTRAL VALUES OF i-TH DESIGNATED IMPORTANT COLOR, $\Delta E_{thi}$ IS $\Delta E$ THAT DEFINES i-TH DESIGNATED NEIGHBORING RANGE, AND L, a, AND b ARE INPUT VALUES

IMAGE PROCESSING APPARATUS AND METHOD

BACKGROUND OF THE INVENTION

1. Field of the Invention

The present invention relates to an image processing apparatus and method and, more particularly, to an image processing apparatus and method for converting a signal in a given color space into that in another color space.

2. Description of Related Art

As personal computers and workstations have prevailed, desktop publishing (DTP) and computer-aided design (CAD) are quite common these days. In such situation, a color reproduction technique for reproducing color expressed on a monitor by a computer using color ink in practice is important. For example, a color reproduction technique for faithfully reproducing color, which is expressed on a monitor, by a color printer in case of DTP, and a color reproduction technique for faithfully reproducing color, which is expressed on a monitor, by mixing inks in case of CAD are required.

In such color reproduction techniques, it is a common practice to use a color conversion technique using a uniform colorimetric system as a medium. Taking DTP as an example, an RGB color signal as color expression in a computer is converted into an $L^*a^*b^*$ color signal using a color conversion formula specified by, e.g., the CIE. Furthermore, the $L^*a^*b^*$ color signal is converted into a CMY color signal. A color printer which uses cyan, magenta, and yellow inks prints these color inks at a ratio according to the CMY color signal.

The core technique in this color reproduction technique is a color signal conversion technique for converting, e.g., an $L^*a^*b^*$ color signal into a CMY color signal.

It is relatively easy to implement color conversion from a CMY color signal into an $L^*a^*b^*$ color signal, and as a method of implementing that color conversion, interpolation using a look-up table (LUT) is known. More specifically, print colors output based on CMY signals are actually sampled at given sampling intervals in the CMY color space and undergo colorimetry. In this case, a uniform colorimetric system such as an $L^*a^*b^*$ colorimetric system is used as that upon colorimetry. After that, interpolation computations are made using data at the sampling points to implement color conversion from a CMY color signal into an $L^*a^*b^*$ color signal. The LUT is used as means for holding $L^*a^*b^*$ color signals at the respective sampling points.

On the other hand, it is not easy to obtain conversion formulas for converting an $L^*a^*b^*$ color signal into a CMY color signal. Hence, color signal conversion is implemented by searching for a CMY color signal corresponding to a $L^*a^*b^*$ color signal that can provide a desired print result. As an example of color signal conversion using a search method, a search method using a gradient method or the like is available. However, when such search method is used, if low-accuracy color conversion is implemented, time cost can be suppressed. However, high time cost is required to implement high-accuracy color conversion.

In a certain color matching process or print color process, if only a color signal conversion apparatus from a first color space into a second color space is available, inverse conversion of a color signal in the second color space into that in the first color space is required using that color signal conversion apparatus.

In order to meet such requirement, data obtained by converting color signals having given spatial intervals in the first color space into those in the second color space are prepared in advance using the color signal conversion apparatus. Next, a color signal closest to that in the second color space to be inversely converted in terms of a given measure of distance is selected from the prepared data, and a color signal in the first color space as a conversion source of the selected color signal is determined as an inverse conversion result of the color signal in the second color space to be inversely converted.

However, the inverse conversion result is an approximate value, and the conversion accuracy depends on the spatial intervals of color signals used upon preparing inverse conversion data. Also, high cost is required for inverse conversion in terms of time, and the efficiency is poor.

DTP and CAD works normally repeat image output and image correction a plurality of number of times. Hence, when a high-accuracy color conversion process is used in color signal conversion, satisfactory color reproduction can be assured, but a very long operation time is required. On the other hand, when a low-accuracy color conversion process is used in color signal conversion, color reproduction is not always satisfactory, but the operation time can be shortened.

However, since the color signal conversion technique used in a given apparatus that executes a color signal conversion process is fixed, it is hard to shorten the operation time with an apparatus that executes a high-accuracy color conversion process, and it is hard to obtain a satisfactory color reproduction result with an apparatus that executes a low-accuracy color conversion process.

SUMMARY OF THE INVENTION

The present invention has been made to solve the aforementioned problems, and has as its object to provide an image processing apparatus and method, which can convert a signal in a given color space into that in another color space with high accuracy and within a short period of time, without preparing any inverse conversion data.

In order to achieve the above object, a preferred embodiment of the present invention discloses an image processing apparatus for converting an input signal in first color space into an output signal in second color space which is different from the first color space, said apparatus comprising: converting means for converting a provided signal in the second color space into a signal in the first color space; extracting means for extracting a difference between the signal output by said converting means and the input signal; and searching means for searching a signal to be provided to said converting means to minimize the extracted difference.

Also, a preferred embodiment of the present invention discloses an image processing apparatus for converting an input signal in first color space into an output signal in second color space which is different from the first color space, said apparatus comprising: converting means for converting a provided signal in the second color space into a signal in the first color space; extracting means for extracting a difference between the signal output by said converting means and the input signal; first searching means for searching a signal to be provided to said converting means to minimize the extracted difference; and second searching means for searching a signal in the vicinity of the signal searched by said first searching means to minimize the extracted difference.

It is another object of the present invention to provide an image processing apparatus and method which can select a satisfactory color reproduction result or a short processing time.

In order to achieve the above object, a preferred embodiment of the present invention discloses an image processing apparatus for converting an input signal in a first color system which expresses color to be reproduced into an output signal in a second color system which is different from the first color system, said apparatus comprising: plurality of converting means, each of which converts the input signal to the output signal by using a different conversion method; and selecting means for manually selecting one of said plurality of converting means.

It is still another object of the present invention to provide an image processing apparatus and method, which can achieve both a satisfactory color reproduction result and a short processing time.

In order to achieve the above object, a preferred embodiment of the present invention discloses an image processing apparatus for converting an input signal in a first color system which expresses color to be reproduced into an output signal in a second color system which is different from the first color system, said apparatus comprising: plurality of converting means, each of which converts the input signal to the output signal by using a different conversion method; setting means for setting at least one color in the first color system; and selecting means for selecting one of said plurality of converting means based on the input signal and the at least one color set by said setting means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 9 shows an example of a message;

FIG. 10 shows a user interface for setting color accuracy;

FIG. 12 is a table showing the correspondence between the designation signal output from a color signal conversion method selector shown in FIG. 11 and the color accuracy designation result;

FIG. 13 is a table showing the relationship between the multiplex signal (selection signal) and the multiplexed output of an MUX shown in FIG. 11;

FIG. 14 is a table showing the relationship between the demultiplex signal (selection signal) and the demultiplexed output of a DMUX shown in FIG. 11;

FIG. 17 shows a user interface for setting an important color in the sixth embodiment;

FIG. 19 is a table showing the output condition of the multiplex/demultiplex signal output from a color conversion method selector shown in FIG. 18.

DESCRIPTION OF THE PREFERRED EMBODIMENTS

The preferred embodiments of an image processing apparatus according to the present invention will be described in detail hereinafter with reference to the accompanying drawings.

Note that the following embodiments will explain an example for converting a color signal in the Lab color space as a second color space into that in the RGB color space as a first color space, and an example for converting a color signal in the Lab color space as a first color space into that in the CMY color space as a second color space. However, the present invention is not limited to these specific types of color spaces, and a color signal can be converted in two ways amongst other arbitrary color spaces such as XYZ, Luv, YIQ, HSB, HSL, CMY, CMYK, sRGB, and the like.

First Embodiment

Figure 1:
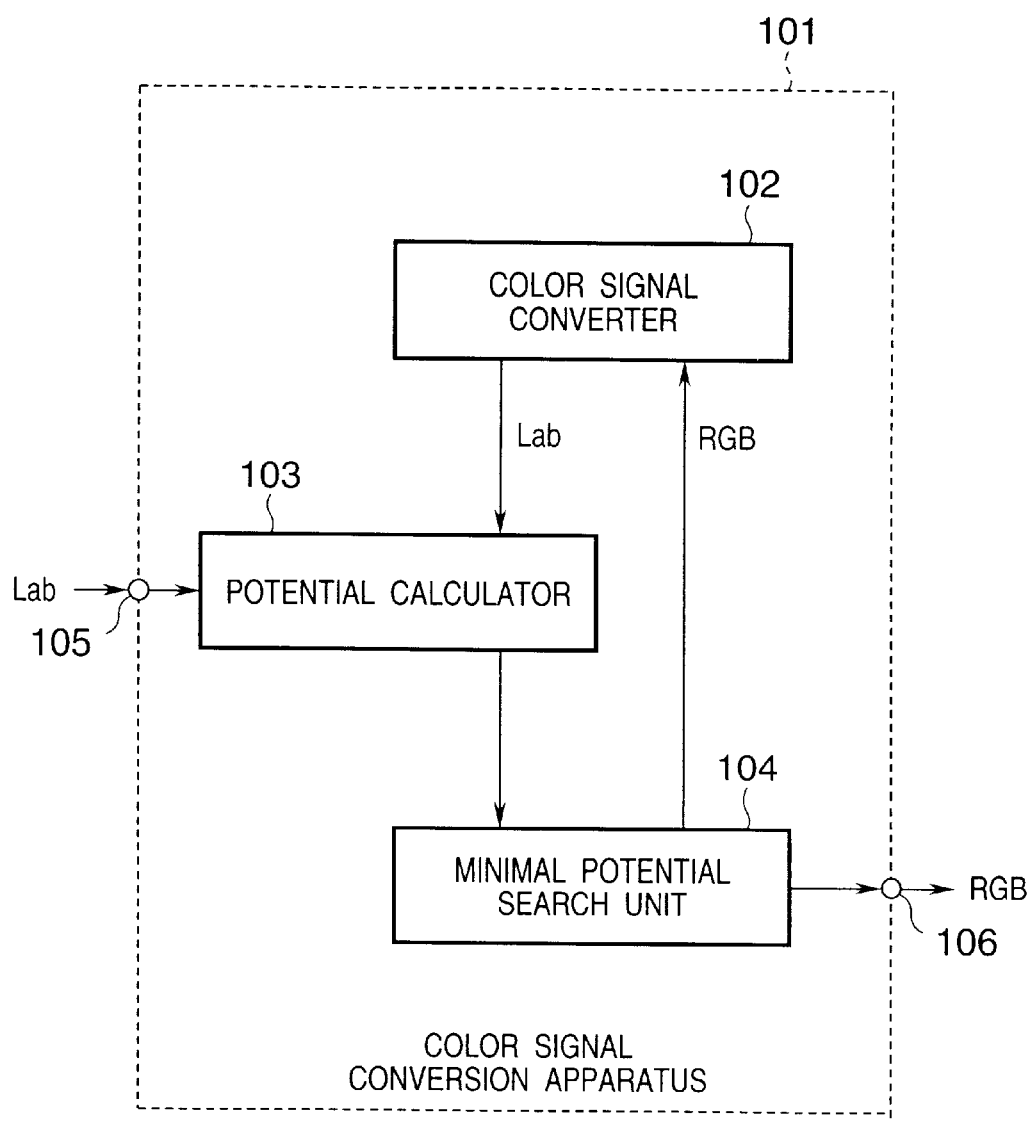
FIG. 1 is a block diagram showing the arrangement of a color signal conversion apparatus according to the first embodiment of the present invention.

FIG. 1 is a block diagram showing the arrangement of a color signal conversion apparatus according to the first embodiment of the present invention.

Reference numeral 101 denotes a color signal conversion apparatus for converting a color signal in the Lab color space into that in the RGB color space. A color signal in the Lab color space as a conversion source is input to a terminal 105, and a color signal in the RGB color space is output from a terminal 106. Reference numeral 102 denotes a color signal converter from the RGB color space into the Lab color space. Reference numeral 103 denotes a potential calculator for calculating the norm of differences between a color signal in the Lab color space input to the terminal 105 and a color signal in the Lab color space output from the color signal converter 102 on the basis of a predetermined measure, and outputting the calculation result as a potential. Reference numeral 104 denotes a minimal potential search unit for searching for a color signal in the RGB color space, which makes the output from the potential calculator 103 minimal, by an iteration algorithm using a gradient method. The search result is output as a color signal in the RGB color space from the terminal 106.

In the above arrangement, the color signal conversion apparatus 101 starts conversion when a color signal in the Lab color space is input from the terminal 105. When the color signal conversion apparatus 101 starts conversion, the minimal potential search unit 104 searches for a color signal in the RGB color space, which makes the output from the potential calculator 103 minimal, on the basis of an iteration algorithm using a gradient method (to be described later), and outputs the search result. Upon making the search, the potential calculator 103 and color signal converter 102 operate to calculate a potential corresponding to a color signal in the Lab color space in accordance with a calculation request from the minimal potential search unit 104 as needed.

The potential calculator 103 calculates a color difference ΔE between an Lab color signal input to the terminal 105 and an Lab color signal as the output from the color signal converter 102 as a differential norm, and outputs the norm as a potential. That is, the calculator 103 calculates the potential ΔE between an Lab color signal (L1, a1, b1) input to the terminal 105 and an Lab color signal (L2, a2, b2) as the output from the color signal converter 102 by:

$$\Delta E = \sqrt{(L1-L2)_2 + (a1-a2)_2 + (b1-b2)^2} \quad (1)$$

Figure 2:
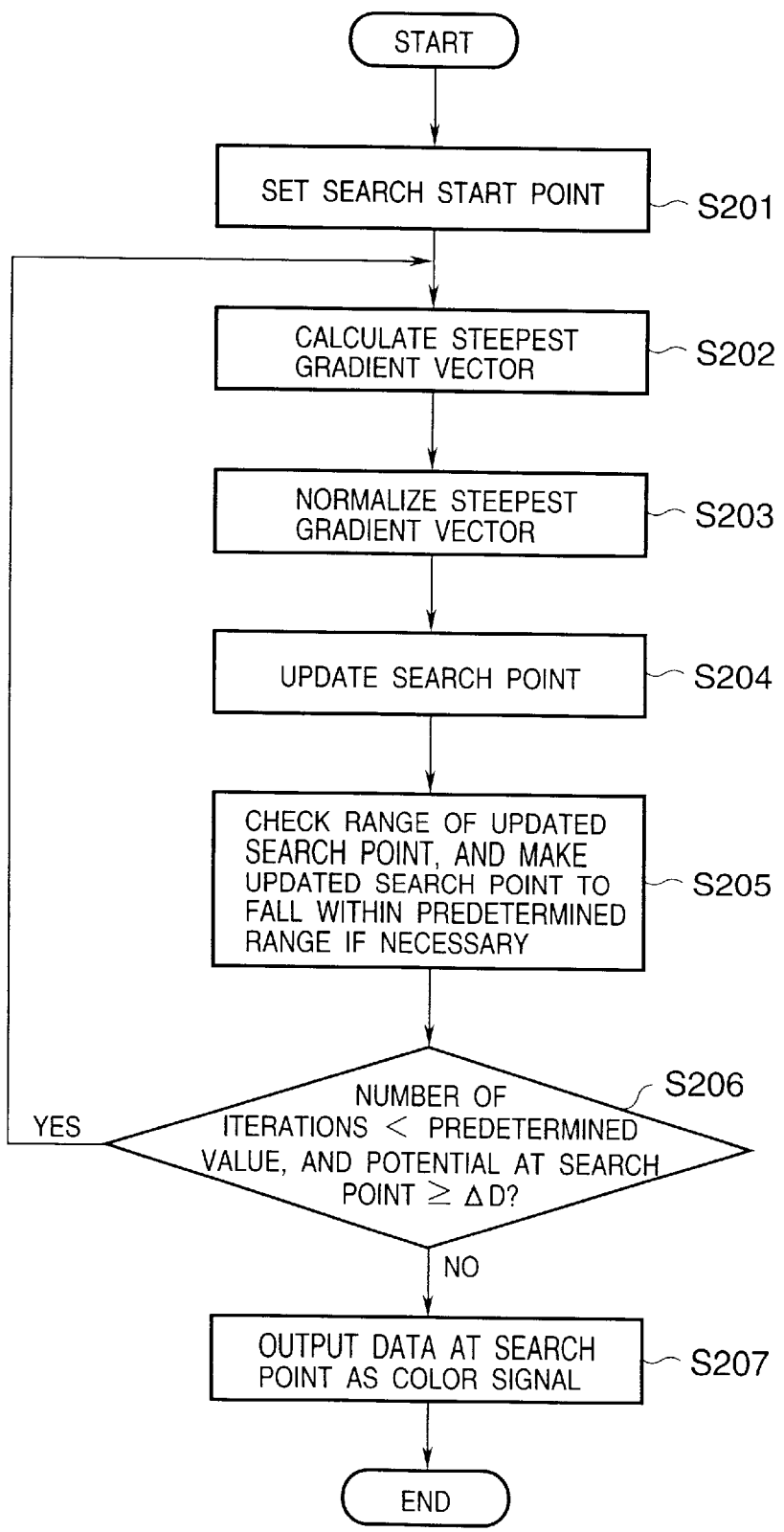
FIG. 2 is a flow chart showing the operation algorithm of a minimal potential search unit in the first embodiment.

FIG. 2 is a flow chart showing the iteration algorithm of the minimal potential search unit 104. Note that F(·) represents the I/O relationship between a color signal in the RGB color space input from the minimal potential search unit 104 to the color signal converter 102, and the potential ΔE output from the potential calculator 103 via the color signal converter 102. "·" is a three-dimensional vector representing an RGB color signal, and F(·) is the potential. Hence, if the I/O relationship is expressed by F(C), the minimal potential search unit 104 inputs each color signal C to the color signal converter 102, and obtains a potential value from the potential calculator 103.

In step S201 in FIG. 2, a color signal $C=(Cr, Cg, Cb)^T$ serving as a search start point is defined in the Lab color space. Note that $(\ )^T$ is the transposed matrix. In step S202, a steepest gradient vector $\nabla=(\nabla r, \nabla g, \nabla b)^T$ at the search point C is calculated by approximation given by:

$$\nabla r = \frac{F(C+\Delta Cr) - F(C-\Delta Cr)}{2\Delta}$$
$$\nabla g = \frac{F(C+\Delta Cg) - F(C-\Delta Cg)}{2\Delta} \quad (2)$$
$$\nabla b = \frac{F(C+\Delta Cb) - F(C-\Delta Cb)}{2\Delta}$$

for $\Delta Cr=(\Delta, 0, 0)^T$, $\Delta Cg=(0, \Delta, 0)^T$, and $\Delta Cb=(0, 0, \Delta)^T$ (Δ is an arbitrary real number)

The steepest gradient vector $\nabla$ is normalized to a unit vector in step S203, and the search point C is updated in step S204 by:

$$C = C + \alpha \times \nabla \quad (3)$$

where α is an arbitrary positive real number.

In step S205, if the updated search point C falls outside a predetermined range R in the Lab color space, the search point C is calculated by approximation to fall within the predetermined range R by:

if (Cr<0) Cr=0;
if (Cr>Rr) Cr=Rr;
  else Cr=Cr;
if (Cg<0) Cg=0
If (Cg>Rg) Cg=Rg;
  else Cg=Cg;
if (Cb<0) Cb=0;
if (Cb>Rb) Cb=Rb;
  else Cb=Cb;
For predetermined range R={(r, g, b); 0≦r≦Rr, 0≦g≦Rg, 0≦b≦Rb}

If it is determined in step S206 that the number of iterations is smaller than a predetermined value, and the potential F(C) is equal to or larger than ΔD, the flow returns to step S202; otherwise, the flow advances to step S207. Note that ΔD is an arbitrary positive real number. In step S207, data at the search point C is output as a color signal in the RGB color space, i.e., the conversion result.

Second Embodiment

An image processing apparatus according to the second embodiment of the present invention will be described below. The same reference numerals in the second embodiment denote the same parts as those in the first embodiment, and a detailed description thereof will be omitted. In the second embodiment, the operation algorithm of the minimal potential search unit 104 in the first embodiment is modified. Hence, a description of the same operations as those in the first embodiment will be omitted, and only modified operations will be explained below.

Figure 3:
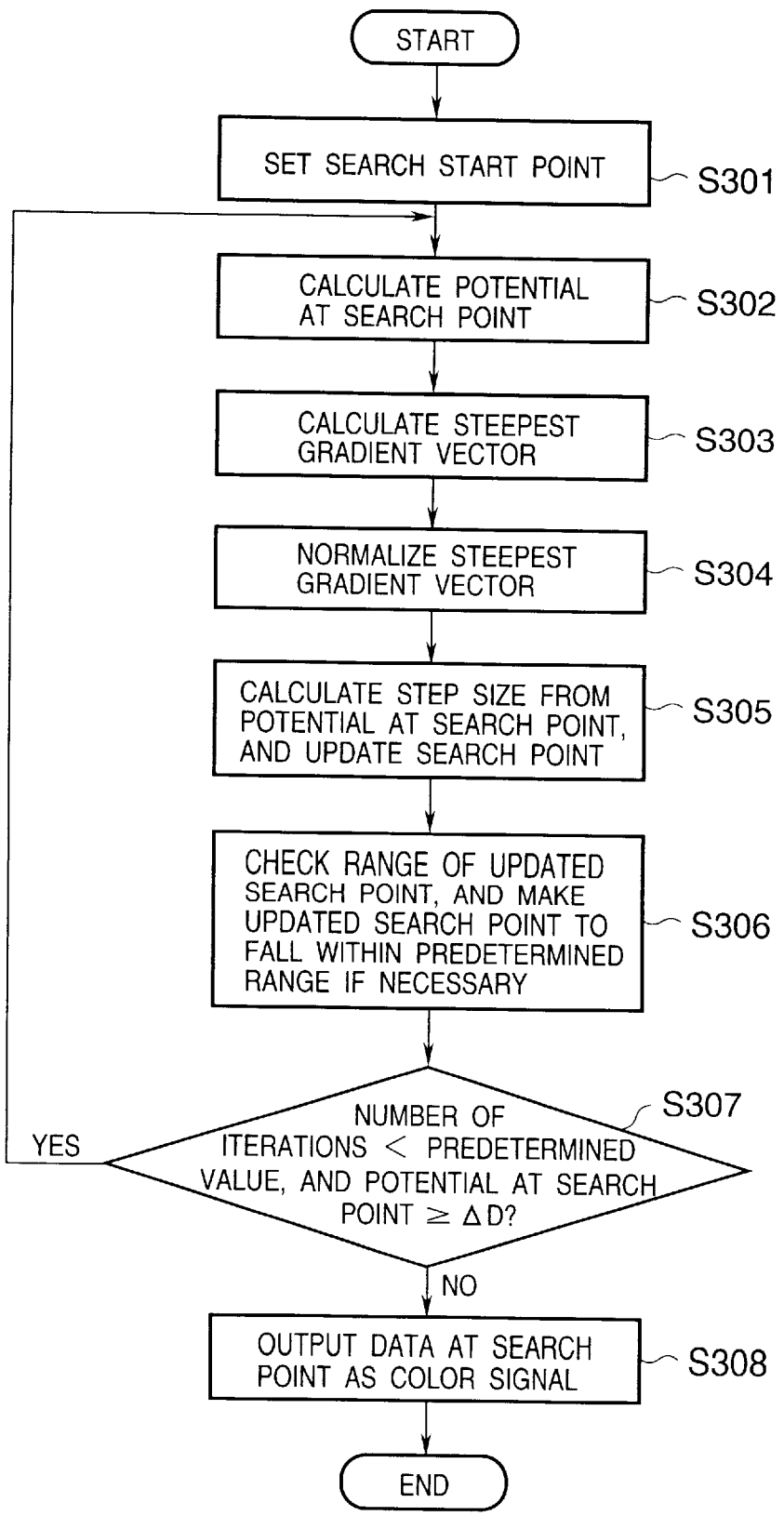
FIG. 3 is a flow chart showing the operation algorithm of a minimal potential search unit in the second embodiment.

FIG. 3 is a flow chart showing the iteration algorithm of the minimal potential search unit 104 of the second embodiment.

In step S301 in FIG. 3, a color signal $C=(Cr, Cg, Cb)^T$ serving as a search start point is defined in the Lab color space. A potential N=F(C) at the search point C is calculated in step S302, and a steepest gradient vector $\nabla=(\nabla r, \nabla g, \nabla b)^T$ at the search point C is calculated by equation (2) above in step S303.

The steepest gradient vector $\nabla$ is normalized to a unit vector in step S304, and the search point C is updated in step S305 using:

$$C = C + \alpha \times M(N) \times \nabla \quad (4)$$

where α is an arbitrary positive real number

In equation (4), M(·) is a correction formula for the potential N. In this embodiment, M(·) is defined by:

if $(x \geq 1) I(x) \sqrt{x}$;

else M(x)=I;

Also, in equation (4), the right-hand side is processed by a floating point calculation, but decimal digits are dropped upon substituting the calculation result in the left-hand side, so that C assumes an integer.

In step S306, if the updated search point C falls outside a predetermined range R in the Lab color space, the search point C is calculated by approximation to fall within the predetermined range R in the same sequence as that in step S205 in FIG. 2. If it is determined in step S307 that the number of iterations is smaller than a predetermined value, and the potential F(C) is equal to or larger than ΔD, the flow returns to step S302; otherwise, the flow advances to step S308. Note that ΔD is an arbitrary positive real number. In step S308, data at the search point C is output as a color signal in the RGB color space, i.e., the conversion result.

Third Embodiment

An image processing apparatus according to the third embodiment of the present invention. The same reference numerals in the third embodiment denote the same parts as those in the first embodiment, and a detailed description thereof will be omitted. In the third embodiment, the operation algorithm of the minimal potential search unit 104 in the first embodiment is modified. Hence, a description of the same operations as those in the first embodiment will be omitted, and only modified operations will be explained below.

Figure 4:
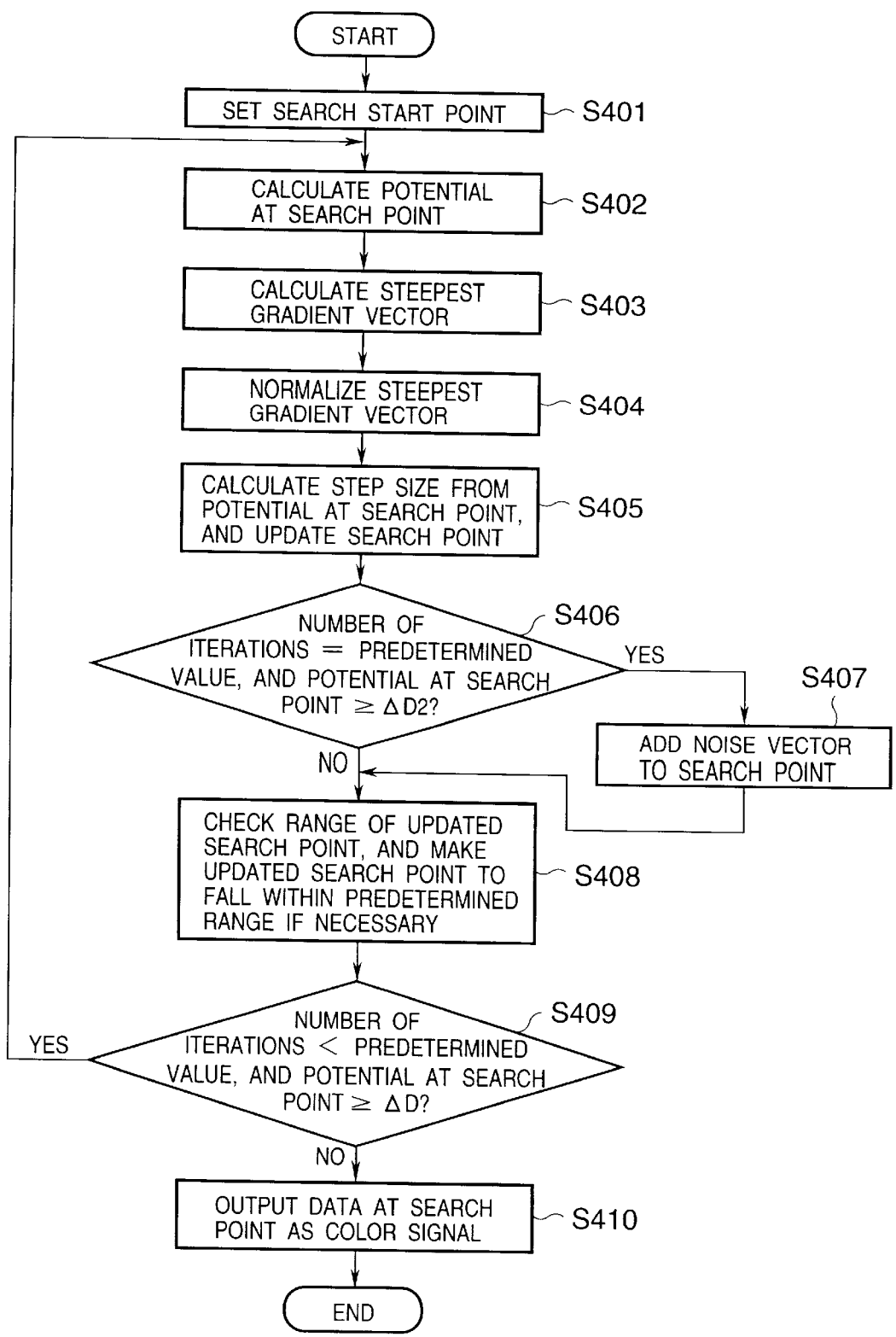
FIG. 4 is a flow chart showing the operation algorithm of a minimal potential search unit in the third embodiment.

FIG. 4 is a flow chart showing the iteration algorithm of the minimal potential search unit 104 of the third embodiment.

In step S401 in FIG. 4, a color signal C (Cr, Cg, Cb)$^T$ serving as a search start point is defined in the Lab color space. A potential N=F(C) at the search point C is calculated in step S402, and a steepest gradient vector $\nabla$=($\nabla$r, $\nabla$g, $\nabla$b)$^T$ at the search point C is calculated by equation (2) above in step S403.

The steepest gradient vector $\nabla$ is normalized to a unit vector in step S404, and the search point C is updated in step S405 using equation (4) above. if it is determined in step S406 that the number of iterations is a predetermined value Ix, and the potential F(C) is equal to or larger than $\Delta$D2, the flow branches to step S407; otherwise, the flow advances to step S408.

In step S407, a noise vector E=(Er, Eg, Eb)$^T$ is calculated in accordance with the predetermined value Ix, and the obtained noise vector is added to the search point C (C=C+E). After that, the flow advances to step S408. The noise vector E is calculated using a random variable p which exhibits a Gaussian distribution, that has a zero-mean probability density function and a variance $\beta$(If−Ix) given by:

$$Er=p,\ Eg=p,\ Eb=p \quad (5)$$

Note that $\Delta$D2>$\Delta$D, Ix<If, $\beta$ is an arbitrary positive real number, and $\Delta$D and If are respectively a potential and the predetermined number of iterations defined in step S407.

In step S408, if the updated search point C falls outside a predetermined range R in the Lab color space, the search point C is calculated by approximation to fall within the predetermined range R in the same sequence as that in step S205 in FIG. 2. If it is determined in step S409 that the number of iterations Itr$_{num}$ is smaller than the predetermined value If, and the potential F(C) is equal to or larger than $\Delta$D, the flow returns to step S402; otherwise, the flow advances to step S410. Note that $\Delta$D is an arbitrary positive real number. In step S410, data at the search point C is output as a color signal in the RGB color space, i.e., the conversion result.

Fourth Embodiment

An image processing apparatus according to the fourth embodiment of the present invention will be described below. The same reference numerals in the fourth embodiment denote the same parts as those in the first embodiment, and a detailed description thereof will be omitted.

Figure 5:
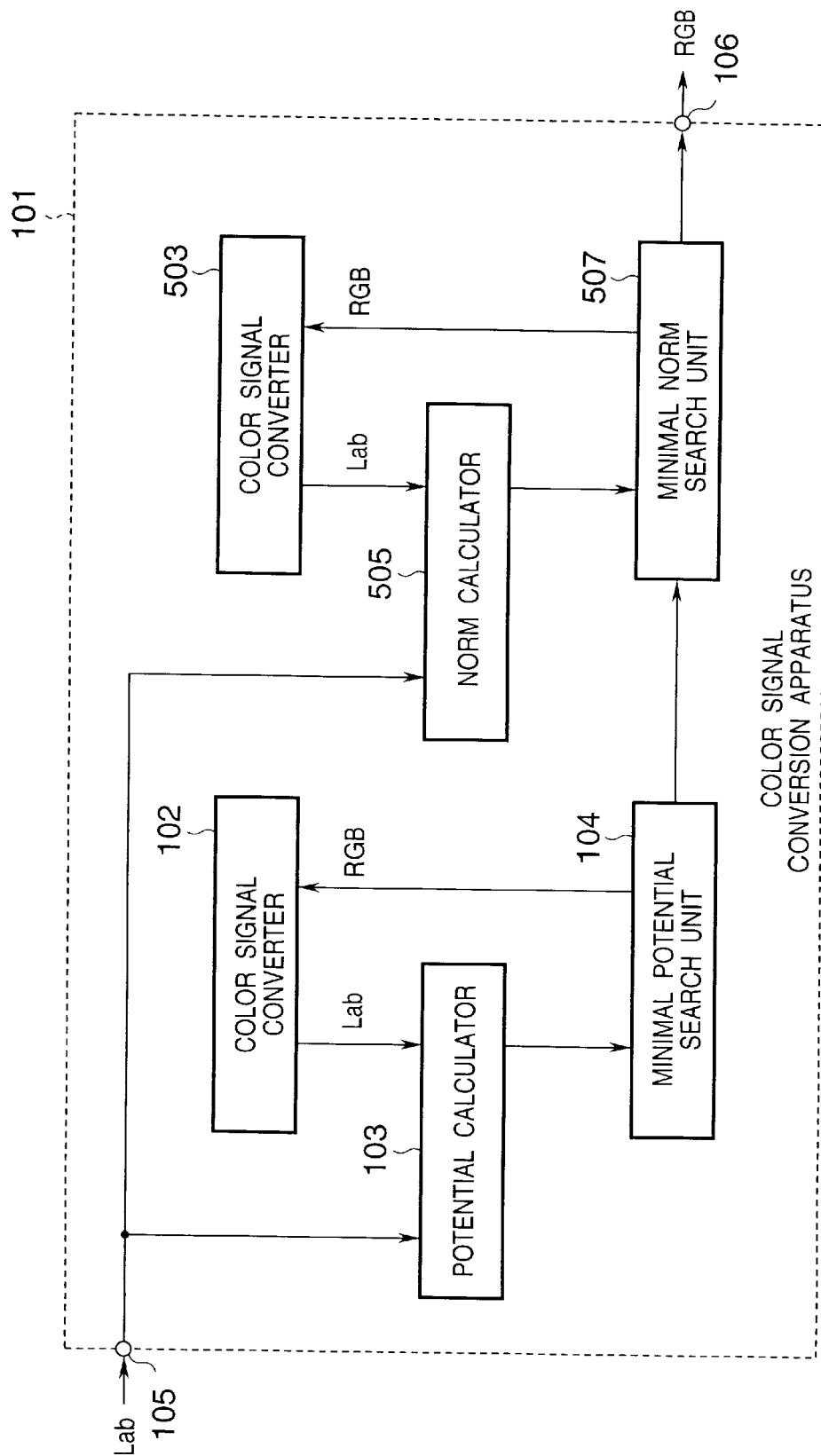
FIG. 5 is a block diagram showing the arrangement of a color signal conversion apparatus according to the fourth embodiment of the present invention.

FIG. 5 is a block diagram showing the arrangement of the color signal conversion apparatus 101 of the fourth embodiment. In this embodiment, a color signal in the Lab color space is converted into that in the RGB color space. Also, assume that the range R of the RGB space is a discrete space defined by R={(r, g, b) $\in$ N3; 0$\leq$r$\leq$255, 0$\leq$g$\leq$255, 0$\leq$b$\leq$255}.

Reference numeral 503 denotes a color signal converter from the RGB color space into the Lab color space. Reference numeral 505 denotes a norm calculator for calculating the norm between a color signal in the Lab color space input to the terminal 105 and a color signal in the Lab color space output from the color signal converter 503 on the basis of a predetermined measure, and outputting the calculation result. Reference numeral 507 denotes a minimal norm search unit for searching for a color signal in the RGB color space, which makes the output from the normal calculator 507 minimal in the vicinity of the search result output from the minimal potential search unit 104. The search result is output from the terminal 106 as a color signal in the RGB color space.

In the above arrangement, the color signal conversion apparatus 101 starts conversion when a color signal in the Lab color space is input from the terminal 105. When the color signal conversion apparatus 101 starts conversion, the minimal potential search unit 104 searches for a color signal in the RGB color space, which makes the output from the potential calculator 103 minimal, on the basis of the iteration algorithm using the gradient method (to be described later), and outputs the search result to the minimal norm search unit 507. Upon making the search, the potential calculator 103 and color signal converter 102 operate to calculate a potential corresponding to a color signal in the Lab color space in accordance with a calculation request from the minimal potential search unit 104 as needed.

After the search result is output from the minimal potential search unit 104, the minimal norm search unit 507 searches for a color signal in the RGB color space, which makes the output from the norm calculator 505 minimal, on the basis of a minimal point search algorithm (to be described later), and outputs the search result. Upon searching, the norm calculator 505 and color signal converter 503 operate to calculate a norm corresponding to a color signal in the Lab color space in accordance with a calculation request from the minimal norm search unit 507 as needed.

The potential calculator 103 calculates a norm with respect to the difference between the Lab color signal input to the terminal 105 and the Lab color signal output from the color signal converter 102 on the basis of the measure given below, and outputs this normal as a potential. That is, the calculator 103 calculates a differential norm D between an Lab color signal C1=(L1, a1, b1) input to the terminal 105 and an Lab color signal C2=(L2, a2, b2) as the output from the color signal converter 102 on a polar coordinate system as follows. That is, the calculator 103 converts the Lab color signal (L1, a1, b1) into a polar coordinate position (L1, C1, H1) by:

$$\begin{aligned} C1 &= \sqrt{a1^2 + b1^2} \\ \text{if } (0 &\leq b1)\, H1 = \cos^{-1}(a1/C1); \\ \text{else } H1 &= -\cos^{-1}(a1/C1); \end{aligned} \quad (6)$$

Likewise, the calculator 103 converts the Lab color signal (L2, a2, b2) into a polar coordinate position (L2, C2, H2), calculates the differential norm D using the converted polar coordinate positions by:

$$D = \sqrt{WL(L1-L2)^2 + WC(L1-L2)^2 + WH \cdot \gamma(H1-H2)^2} \quad (7)$$

where WL, WC, and WH are weighting coefficients, and $\gamma$=(C1+C2)/2 and outputs the calculated differential norm D as a potential.

The norm calculator 505 calculates a norm with respect to the difference between the Lab color signal input to the terminal 105 and the Lab color signal output from the color signal converter 503 on the basis of the measure given below, and outputs the norm. That is, the calculator 505 calculates a differential norm D between an Lab color signal C1=(L1, a1, b1) input to the terminal 105 and an Lab color signal C2=(L2, a2, b2) output from the color signal converter 102 on the polar coordinate system using equation (5) above. More specifically, the calculator 503 converts the Lab color signal (L1, a1, b1) into a polar coordinate position (L1, C1, H1), similarly converts the Lab color signal (L2, a2, b2) into a polar coordinate position (L2, C2, H2), and calculates the differential norm D from these polar coordinate positions using equation (6) above.

Figure 6:
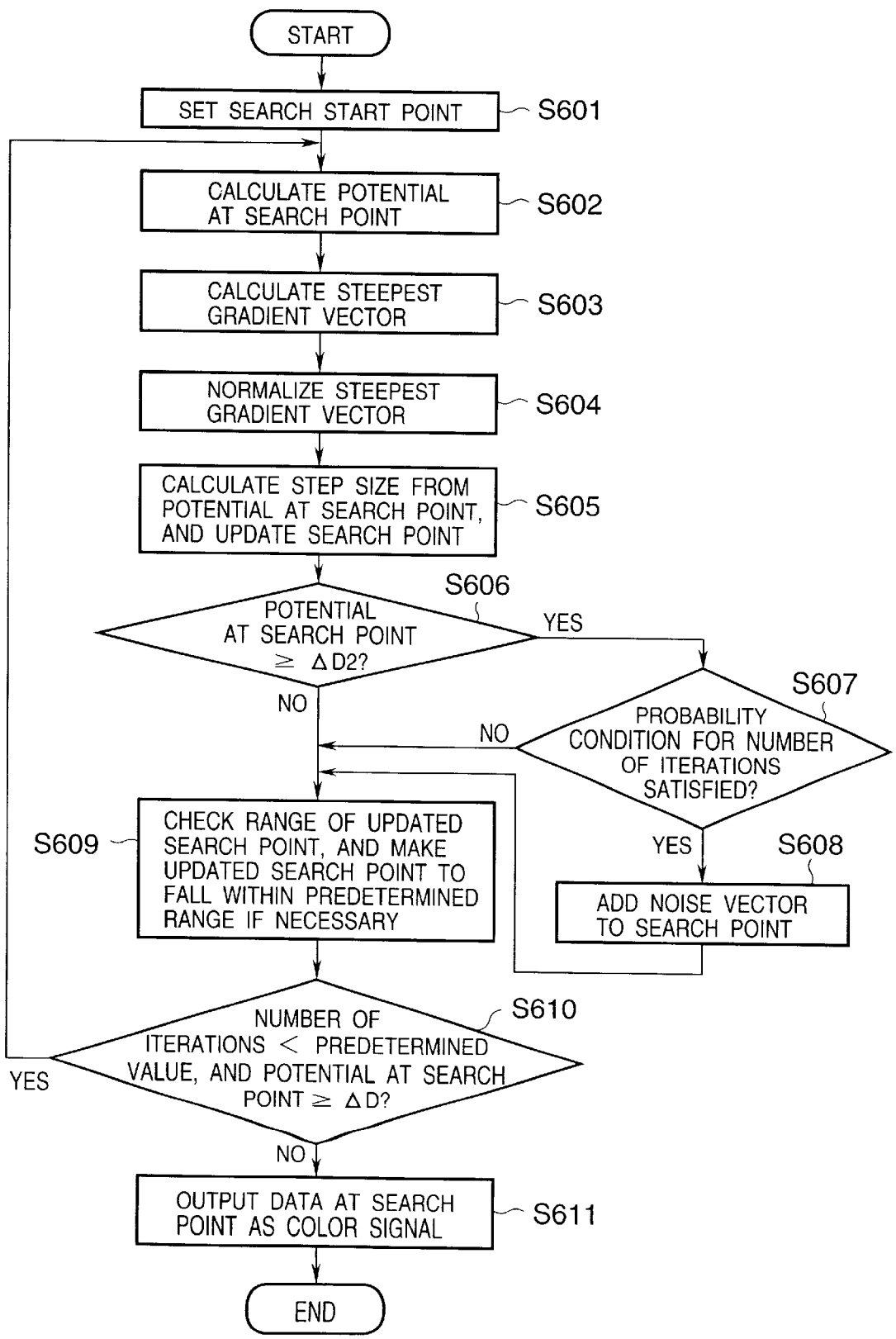
FIG. 6 is a flow chart showing the operation algorithm of a minimal potential search unit in the fourth embodiment.

FIG. 6 is a flow chart showing the iteration algorithm of the minimal potential search unit 104.

In step S601 in FIG. 6, a color signal $C=(Cr, Cg, Cb)^T$ serving as a search start point is defined on the Lab color space. A potential N=F(C) at the search point C is calculated in step S602, and a steepest gradient vector $\nabla=(\nabla r, \nabla g, \nabla b)^T$ at the search point C is calculated by equation (2) above in step S603.

The steepest gradient vector $\nabla$ is normalized to a unit vector in step S604, and the search point C is updated in step S605 using equation (4) above. If it is determined in step S606 that the potential F(C) is equal to or larger than $\Delta D2$, the flow branches to step S607; otherwise, the flow advances to step S609.

If it is determined in step S607 that a random variable p2 which exhibits a Gaussian distribution, that has a zero-mean probability density function and a variance $\sigma^2$ satisfies:

$$\delta \leq p2 \leq (\delta + \Delta\delta) \quad (8)$$

for $$\delta = 2\sigma \frac{If/2 - Itr_{num}}{If/2}$$

where $\sigma$ and $\Delta\sigma$ are arbitrary real numbers, and $Itr_{num}$ is the current number of iterations the flow advances to step S608; otherwise, the flow advances to step S609.

In step S608, a noise vector $E=(Er, Eg, Eb)^T$ is calculated in accordance with the number of iterations $Itr_{num}$ in the same sequence as that in the third embodiment and using equation (5) above, and the obtained vector noise E is normalized to a maximum value of one. The normalized vector is added to the search point C to update the search point C by:

$$C=C+\gamma(If-Itr_{num})E \quad (9)$$

After that, the flow advances to step S609. In equation (9), the right-hand side is processed by a floating point calculation, but decimal digits are dropped upon substituting the calculation result in the left-hand side, so that C assumes an integer.

In step S609, if the updated search point C falls outside a predetermined range R in the Lab color space, the search point C is calculated by approximation to fall within the predetermined range R in the same sequence as that in step S205 in FIG. 2. If it is determined in step S610 that the number of iterations $Itr_{num}$ is smaller than the predetermined value If, and the potential F(C) is equal to or larger than $\Delta D$, the flow returns to step S602; otherwise, the flow advances to step S611. In step S611, data at the search point C as a signal in the RGB color space is output to the minimal norm search unit 507.

Figure 7:
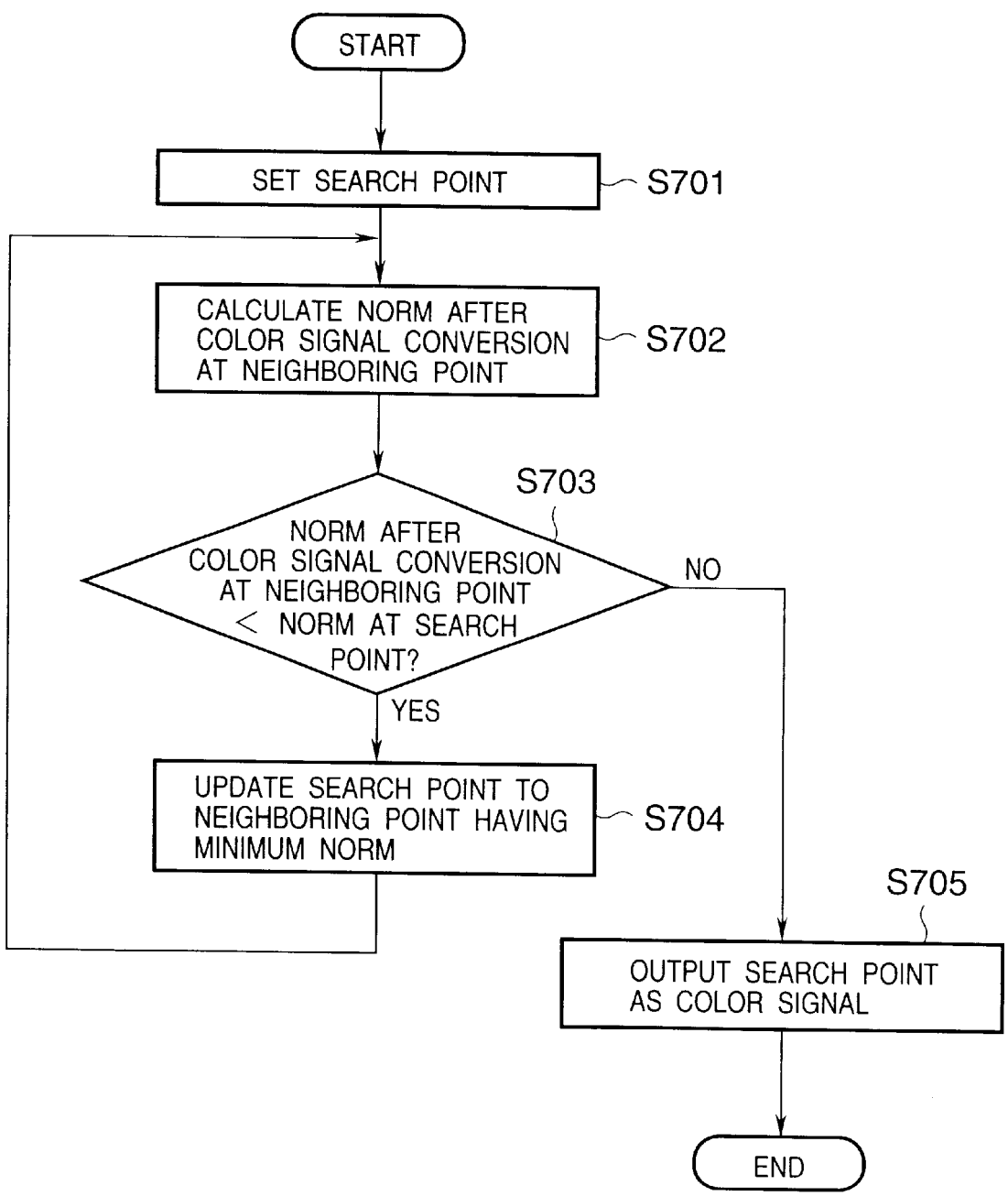
FIG. 7 is a flow chart showing the operation algorithm of a minimal norm search unit in the fourth embodiment.

FIG. 7 is a flow chart showing the search algorithm of the minimal norm search unit 507. Note that G(·) represents the I/O relationship between the color signal in the RGB color space input from the minimal norm search unit 507 to the color signal converter 503, and the norm output from the norm calculator 505 via the color signal converter 503. "·" is a three-dimensional vector representing an RGB color signal, and G(·) is the norm.

In step S701 in FIG. 7, an output value from the minimal potential search unit 104 is set by defining a search start point on the RGB color space by $C=(Cr, Cg, Cb)^T$. In step S702, differential norms after color signal conversion are respectively calculated at 26 points around the search point C. If it is determined in step S703 that the calculated differential norm at each neighboring point is smaller than that of the search point C, the flow advances to step S704; otherwise, the flow advances to step S705.

In step S704, the search point C is updated to the point with the minimum differential norm, and the flow then returns to step S702. In step S705, data at the search point C is output as a color signal in the RGB color space, i.e., the conversion result.

In the embodiments described above, the aforementioned problem can be solved by applying the gradient method to color signal conversion. For example, upon inversely converting a color signal from the Lab color space to the RGB color space, a scalar field is formed on the RGB color space using differential norms between the conversion results of individual color signals in the RGB color space into those in the Lab color space using a color signal conversion apparatus (corresponding to the color signal converters 102 and 503 in FIGS. 1 and 5), and an input color signal, and an output color signal is searched for using this scalar field. Hence, when a color signal conversion apparatus from the first color space (e.g., RGB color space) into the second color space (e.g., Lab color space) is available, a color signal can be inversely converted from the second color space into the first color space with high accuracy and at high speed. As can be seen from the fourth embodiment, even when the search algorithm does not converge due to the fact that the search point is a discrete space, this problem can be avoided by providing an appropriate means.

Note that the arrangements shown in FIGS. 1 and 5, and the processes shown in FIGS. 2 to 4, 6, and 7 are implemented by supplying a program and data stored in a storage medium such as a ROM or the like to a CPU, and executing the supplied program by the CPU using a RAM or the like as a work memory. Also, the color signal converter, potential calculator, norm calculator, and the like can be implemented using a look-up table.

Fifth Embodiment

[Arrangement]

Figure 8:
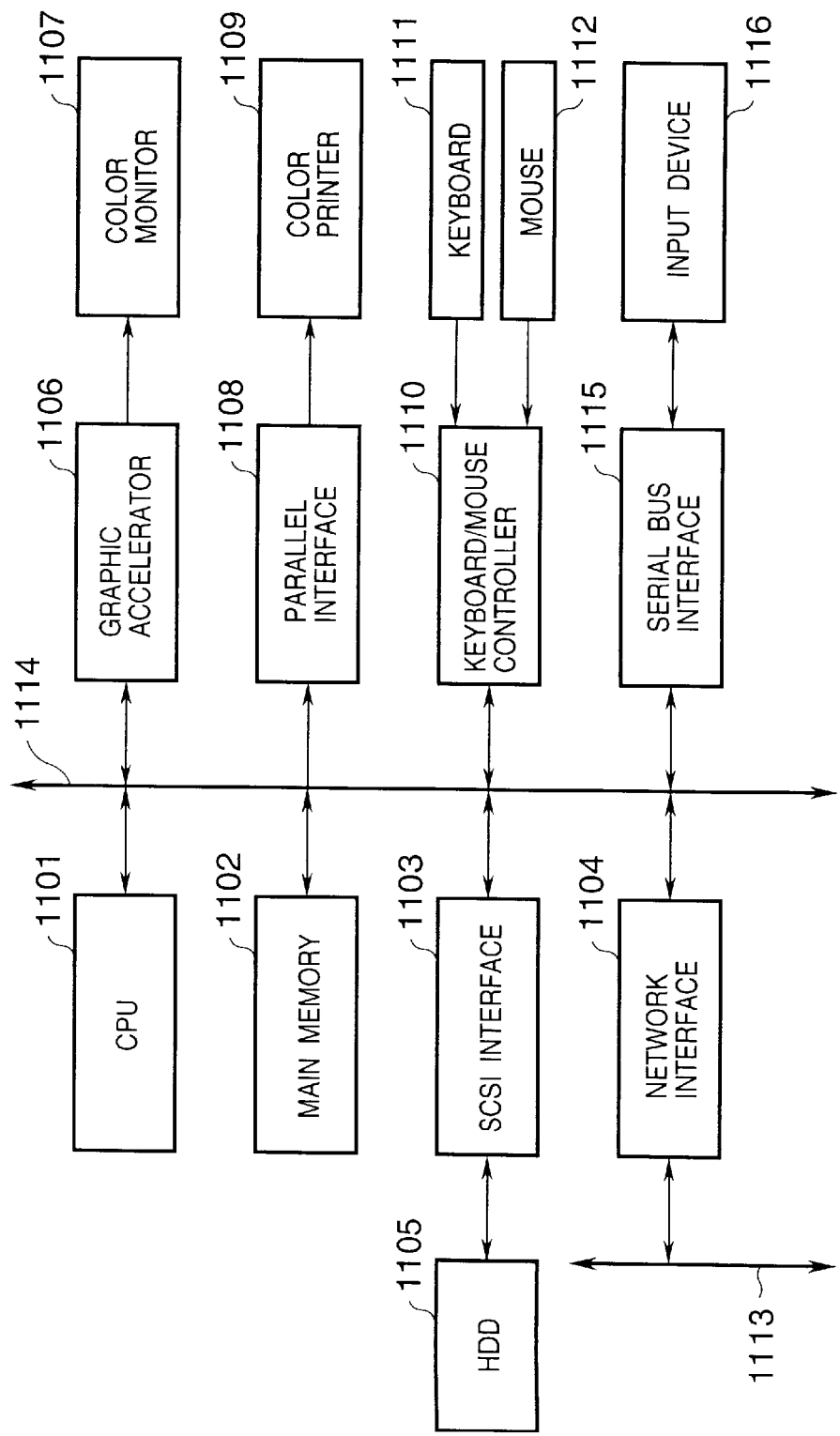
FIG. 8 is a block diagram showing the arrangement of a color signal conversion apparatus according to the fifth embodiment of the present invention.

FIG. 8 is a block diagram showing the arrangement of a color signal conversion apparatus according to the fifth embodiment of the present invention. This apparatus can be constructed by a computer system mainly built by, e.g., a personal computer.

Referring to FIG. 8, a CPU 1101 executes an operating system (OS), application software, and the like stored in a hard disk drive (HDD) 1105 using a main memory 1102 as a work area, and controls various kinds of function units connected via a Peripheral Component Interconnect (PCI) bus 1114.

The function units connected to the PCI bus 1114 include a Small Computer System Interface (SCSI) 1103, a network interface 1104 for connecting a network 1113 such as a Local Area Network (LAN) or the like, a graphic accelerator 1106 for connecting a color monitor 1107 such as a CRT, LCD, or the like, a parallel interface 1108 such as a Centronics interface for connecting a color printer 1109, a keyboard/mouse controller 1110 for connecting a keyboard 1111 and a pointing device 1112 such as a mouse or the like, a serial bus interface 1115 such as a Universal Serial Bus (USB) interface, IEEE1394 interface, or the like for connecting an image input device 1116 such as an image scanner, film scanner, digital still camera, digital video camera, or the like, and so on.

In the above computer system, the user outputs a desired image from the color printer 1109 in the following procedure.

Prior to printing, calibration is done. When the user instructs the computer system to start calibration, the CPU 1101 generates a color patch image expressed by a CMY color signal in accordance with a predetermined algorithm, and stores it in the main memory 1102. The CPU 1101 then transmits the CMY image data held in the main memory 1102 to the printer 1109 via the PCI bus 1114 and parallel interface 1108. The printer 1109 outputs a color patch image in accordance with the received CMY image data.

After that, the CPU 1101 sends a message shown in FIG. 9 to the graphic accelerator 1106 to prompt the user to set the output color patch image on the input device 1116 such as a scanner or the like, thus displaying the message on the color monitor 1107. The user sets the color patch image on the scanner or the like in accordance with the displayed message, and informs the computer system that he or she has set the image.

Upon receiving the information indicating that the color patch image has been set on the scanner or the like, the CPU 1101 instructs the input device 1116 to start an original scan. Image data as a result of the original scan is stored in the main memory 1102 via the serial bus interface 1115 and PCI bus 1114. The CPU 1101 performs an image process for the image data stored in the main memory 1102 to calculate the relationship between the CMY color signal and the output color of the printer 1109, and stores the calculation result in the main memory 1102 as conversion information (calibration table) from the CMY color signal to an Lab color signal.

After the calibration, a color image is ready to print. The user instructs the computer system to load image data from the HDD 1105 or network 1113. Image data stored in the HDD 1105 is transferred to the main memory 1102 via the SCSI 1103 and PCI bus 1114 in accordance with an instruction from the CPU 1101. Or image data stored in a server connected to the network 1113 or image data on the Internet is transferred to the main memory 1102 via the network interface 1104 and PCI bus 1114 in accordance with an instruction from the CPU 1101. The image data is stored in the main memory 1102 as that expressed by an RGB color signal (to be referred to as "RGB image data" hereinafter).

The RGB image data held in the main memory 1102 is transferred to the graphic accelerator 1106 via the PCI bus 1114 in accordance with an instruction from the CPU 1101. The graphic accelerator 1106 digital-to-analog (D/A)-converts the RGB image data, and sends the digital data to the color monitor 1107, thus displaying an image on the color monitor 1107.

When the user issues a command to print the image displayed on the color monitor 1107, i.e., the RGB image data held in the main memory 1102, the CPU 1101 asks the user color accuracy that he or she wants using a user interface shown in FIG. 10. That is, the CPU 1101 prompts the user to determine if the color process of the image data to be printed is done in a processing accuracy priority mode or a processing speed priority mode.

After the color accuracy is designated, the CPU 1101 converts the RGB image data held in the main memory 1102 into image data expressed by an Lab color signal (to be referred to as "Lab image data" hereinafter), and stores the obtained Lab image data in the main memory 1102. The CPU 1101 then converts the Lab data stored in the main memory 1102 into image data expressed by a CMY color signal (to be referred to as "CMY image data" hereinafter), and stores the obtained CMY image data in the main memory 1102. After that, the CMY image data stored in the main memory 1102 is sent to the color printer 1109 via the PCI bus 1114 and parallel interface 1108 in accordance with an instruction from the CPU 1101, thus printing a color image.

[Color Signal Conversion]

Figure 11:
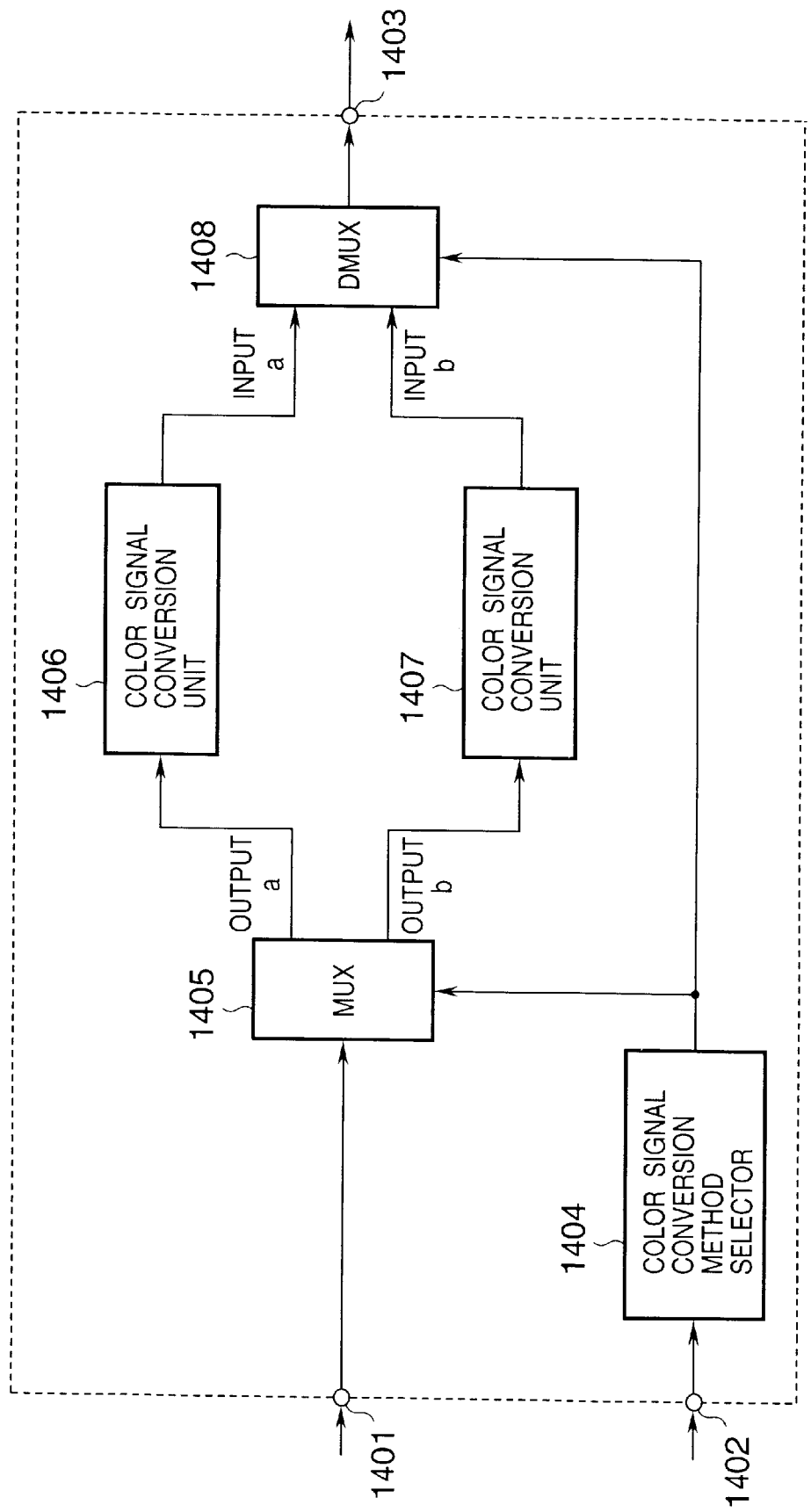
FIG. 11 is a block diagram showing the functional arrangement for implementing a conversion algorithm from Lab color space expression into CMY color space expression.

FIG. 11 is a block diagram showing the functional arrangement that implements a conversion algorithm from Lab color signal expression into CMY color signal expression.

Referring to FIG. 11, Lab image data as a conversion source of the conversion process is input from a terminal 1401, and CMY image data as a conversion result is output from a terminal 1403. A color accuracy designation signal by the user is input from a terminal 1402.

A color conversion method selector 1404 that receives the color accuracy designation signal stores the designation signal, and outputs a multiplex/demultiplex signal. FIG. 12 shows the correspondence between the color accuracy designation result (user's designation result) represented by the designation signal, and the multiplex/demultiplex signal.

A multiplexer (MUX) 1405 multiplexes Lab image data input from the terminal 1401 in accordance with a multiplex signal, and outputs the multiplexed data to a color signal conversion unit 1406 or 1407. The color signal conversion unit 1406 converts Lab image data into CMY image data by a steepest descent algorithm (to be described later). The color signal conversion unit 1407 converts Lab image data into CMY image data by a full-search algorithm (to be described later). A demultiplexer (DMUX) 1408 demultiplexes the outputs from the color signal conversion units 1406 and 1407 in accordance with a demultiplex signal and outputs CMY image data to the terminal 1403.

FIG. 13 shows the relationship between the multiplex signal (selection signal) of the MUX 1405 and the multiplex output, and FIG. 14 shows the relationship between the demultiplex signal (selection signal) of the DMUX 1408 and the demultiplex input. That is, when the processing speed priority mode is designated, a color signal is converted by the color signal conversion unit 1406; when the processing accuracy priority mode is designated, a color signal is converted by the color signal conversion unit 1407.

[Color Signal Conversion Unit]

Figure 15:
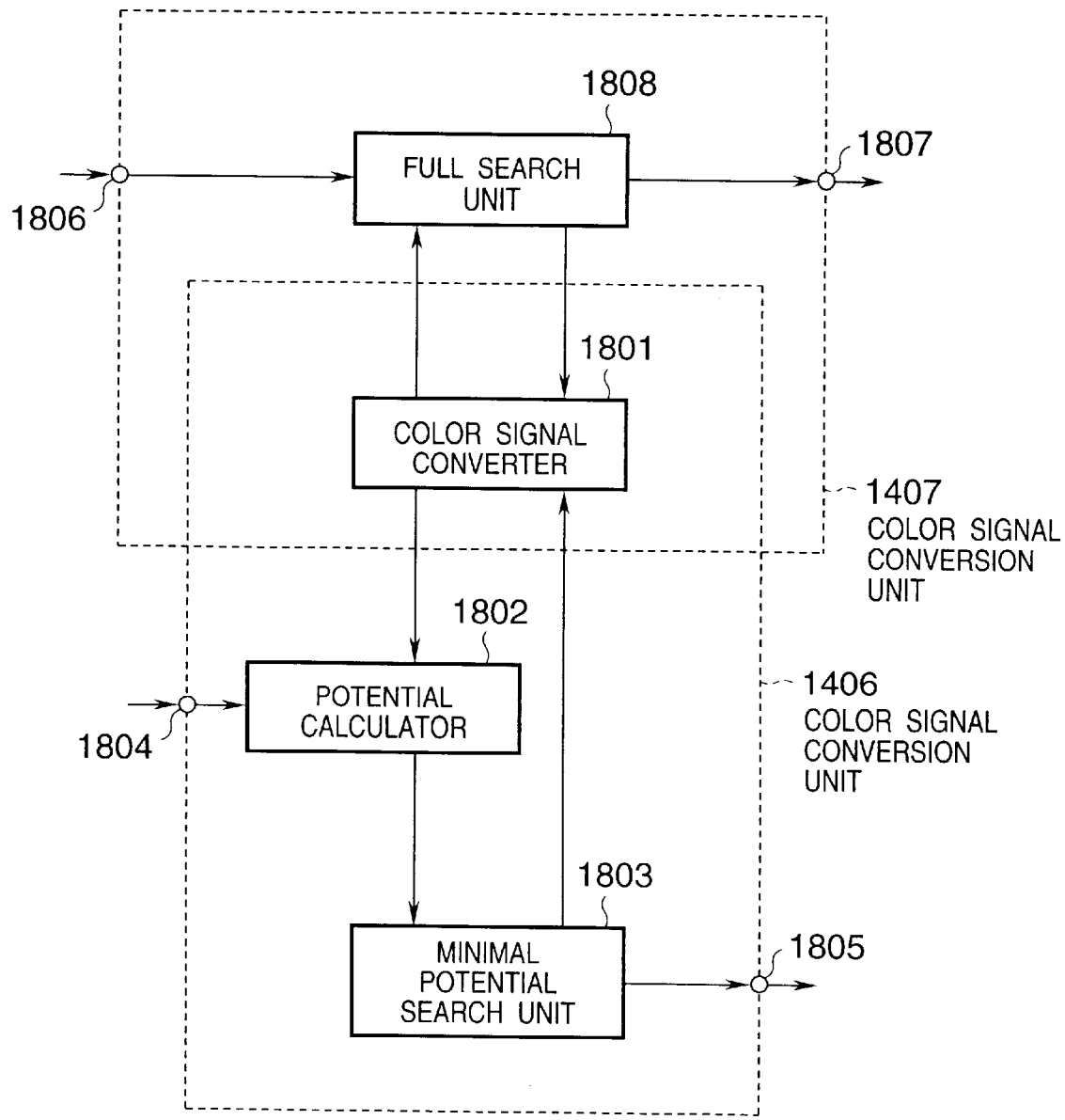
FIG. 15 is a block diagram showing the functional arrangement of a color signal converter shown in FIG. 11.

FIG. 15 is a block diagram showing the functional arrangement of the color signal conversion units 1406 and 1407.

Referring to FIG. 15, a color signal converter 1801 converts a CMY color signal into an Lab color signal. Color signal conversion by the color signal converter 1801 uses a calibration table as the conversion information from a CMY color signal into an Lab color signal, which has been generated by calibration and stored in the main memory 1102. As can be seen from FIG. 15, the color signal converter 1801 is shared by the color signal conversion units 1406 and 1407.

When the processing speed priority mode is designated, an Lab color signal as the conversion source of the conversion process is input from a terminal 1804 of the color signal conversion unit 1406, and a CMY color signal as the conversion result is output from a terminal 1805. A potential calculator 1802 calculates the differential norm between the Lab color signal input from the terminal 1804 and the Lab color signal as the output from the color signal converter 1801 on the basis of a predetermined measure, and outputs the calculation result as a potential. A minimal potential search unit 1803 searches for a CMY color signal that makes the output from the potential calculator 1802 minimal, on the basis of an iteration algorithm using a gradient method. The search result is output as a CMY color signal of the conversion result from the terminal 1805.

When the processing accuracy priority mode is designated, an Lab color signal as the conversion source of the conversion process is input from a terminal 1806 of the color signal conversion unit 1407, and a CMY color signal as the conversion result is output from a terminal 1807. A full-search unit 1808 searches for a CMY color signal which makes the differential square norm between the output from the color signal converter 1801 and the Lab color signal as the conversion source minimal, while changing the CMY color signal at predetermined step sizes. The search result is output as a CMY color signal of the conversion result from the terminal 1807.

Operation of Color Signal Conversion Unit 1406

The operation of the color signal conversion unit 1406 that executes a color signal conversion process in the processing speed priority mode will be described in detail below.

The color signal conversion unit 1406 starts operation when an Lab color signal is input to the terminal 1804. When the color signal conversion unit 1406 starts operation, the minimal potential search unit 1803 searches for a color signal in a first color space, which makes the output from the potential calculator 1802 minimal, on the basis of the iteration algorithm using the gradient method (to be described later), and outputs the search result. Upon making the search, the potential calculator 1802 and color signal converter 1801 operate to calculate a potential corresponding to an Lab color signal input to the terminal 1804 in accordance with a calculation request from the minimal potential search unit 1803 as needed.

The potential calculator 1802 calculates as a differential norm a color difference AE between an Lab color signal (L1, a1, b1) input to the terminal 1804 and an Lab color signal (L2, a2, b2) as the output from the color signal converter 1801 by:

$$\Delta E = \sqrt{(L1-L2)^2 + (a1-a2)^2 + (b1-b2)^2} \quad (10)$$

and outputs the calculation result as a potential.

Iteration Algorithm of Minimal Potential Search Unit

The iteration algorithm of the minimal potential search unit 1803 will be described in detail below with reference to FIG. 16. Note that F(·) represents the I/O relationship between a CMY color signal input from the minimal potential search unit 1803 to the color signal converter 1801, and the potential output from the potential calculator 1802 via the color signal converter 1801. "·" is the three-dimensional vector representing an RGB color signal, and F(·) is the potential. Hence, if the I/O relationship is expressed by F(C), the minimal potential search unit 1803 inputs each color signal C to the color signal converter 1801, and obtains a potential value from the potential calculator 1802.

Figure 16:
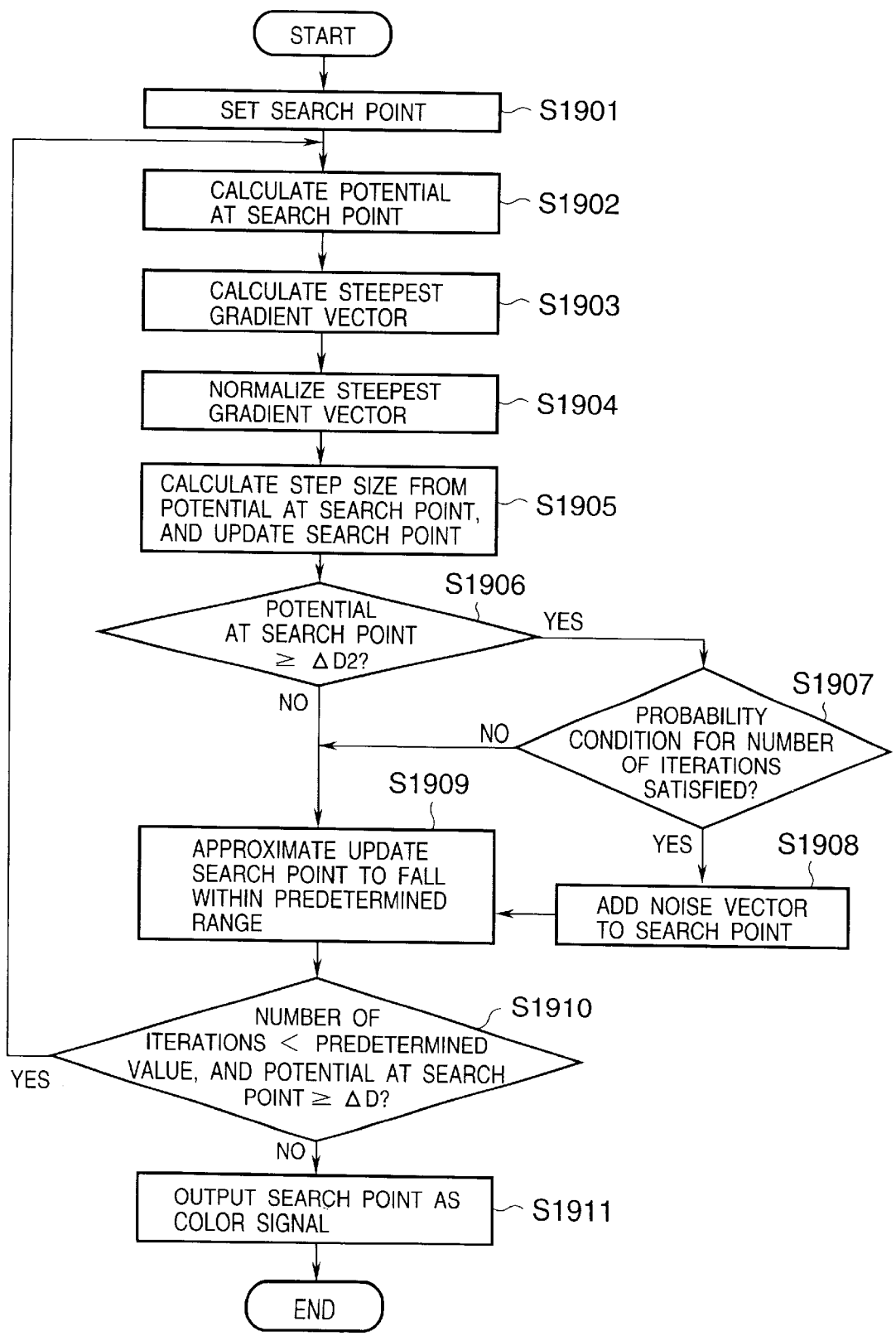
FIG. 16 is a flow chart for explaining an iteration algorithm implemented by a minimum potential search unit shown in FIG. 15.

In step S1901 in FIG. 16, a color signal $C=(Cc, Cm, Cy)^T$ serving as a search start point is defined in the first color space. A potential $N=F(C)$ at the search point C is calculated in step S1902, and a steepest gradient vector $\nabla=(\nabla c, \nabla m, \nabla y)^T$ at the search point C is calculated in step S1903 by approximation given by:

$$\begin{aligned}\nabla c &= \frac{F(C+\Delta Cc) - F(C-\Delta Cc)}{2\Delta} \\ \nabla m &= \frac{F(C+\Delta Cm) - F(C-\Delta Cm)}{2\Delta} \\ \nabla y &= \frac{F(C+\Delta Cy) - F(C-\Delta Cy)}{2\Delta}\end{aligned} \quad (11)$$

For $\Delta Cc=(\Delta, 0, 0)^T$, $\Delta Cm=(0, \Delta, 0)^T$, and $\Delta Cy=(0, 0, \Delta)^T$ ($\Delta$ is an arbitrary real number)

The steepest gradient vector $\nabla$ is normalized to a unit vector in step S1904, and the search point C is updated in step S1905 using:

$$C = C + \alpha \times M(N) \times \nabla \quad (12)$$

where $\alpha$ is an arbitrary positive real number.

In equation (12), M(·) is a correction formula for the potential N. In this embodiment, M(·) is defined by:

*if* $(x \geq 1) M(x) = \sqrt{x}$;

else $M(x) = x$;

If it is determined in step S1906 that the potential F(C) is equal to or larger than $\Delta D2$, the flow branches to step S1907; otherwise, the flow advances to step S1909. Note that $\Delta D2 > \Delta D$, and $\Delta D$ is the potential level used in step S1910.

If it is determined in step S1907 that a random variable p2 which exhibits a Gaussian distribution, that has a zero-mean probability density function and a variance $\sigma^2$ satisfies:

$$2\sigma \frac{If/2 - Itr_{num}}{If/2} \leq p2 \quad (13)$$

and $$2\sigma \frac{If/2 - Itr_{num}}{If/2} + \Delta\sigma \geq p2$$

where $\sigma$ and $\Delta\sigma$ are arbitrary real numbers, and $Itr_{num}$ is the current number of iterations. that is, if the probability conditions for the number of iterations are satisfied, the flow advances to step S1908; otherwise, the flow advances to step S1909.

In step S1908, a noise vector $E=(Er, Eg, Eb)^T$ is calculated in accordance with the number of iterations $Itr^{num}$. The noise vector E is calculated using a random variable p which exhibits a Gaussian distribution, that has a zero-mean probability density function and a variance $\beta \times (If - Itr_{num})$ given by:

$$Er=p, \; Eg=p, \; Eb=p \quad (14)$$

The obtained vector noise E is normalized to a maximum value of one. The normalized vector is added to the search point C to update the search point C by:

$$C = C + \gamma (If - Itr_{num}) \times E \quad (15)$$

After the search point C is updated, the flow advances to step S1909. In step S1909, if the updated search point C falls outside a predetermined range in the CMY color space, the search point C is calculated by approximation to fall within the predetermined range. If a predetermined range R is defined by R={(c, m, y); $0 \leq c < 255$, $0 \leq m \leq 255$, $0 \leq y \leq 255$}, approximation is made using equations (16):

*if*(Cc<0)Cc=0;

else*if*(Cc>255)Cc=255;

else $Cc=Cc$;

$if(Cm<0)Cm=0$;

else$if(Cm>255)Cm=255$; (16)

else $Cm=Cm$ $if(Cy<0)Cy=0$;

else$if(Cy>255)Cy=255$;

else $Cy=Cy$;

If it is determined in step S1910 that the number of iterations $Itr_{num}$ is smaller than the predetermined value If, and the potential F(C) is equal to or larger than ΔD, the flow returns to step S1902. If these conditions are not satisfied, the flow advances to step S1911, and data at the search point C is output as a CMY color signal of the conversion result. Operation of Color Signal Conversion Unit 1407

The operation of the color signal conversion unit 1407 that executes a color signal conversion process in the processing accuracy priority mode will be described in detail below.

The color signal conversion unit 1407 starts operation when an Lab color signal is input to the terminal 1806, and searches for a CMY color signal as the conversion result by the following algorithm.

For all possible combinations (i, j, k) of CMY color signals C=(i×ΔCc, j×ΔCm, k×ΔCy), differential square norms between the outputs from the color signal converter 1801 and the Lab color signal as the conversion source are calculated. After that, a set (l, m, n) of (i, j, k) that makes the differential square norm minimum is selected, and a CMY color signal C=(l×ΔCc, m×ΔCm, n×ΔCy) of the conversion result is output from the terminal 1807. According to this method, an optimal solution can be obtained in a predetermined sampling step. Note that i, j, and k are natural numbers, and ΔCc, ΔCm, and ΔCy are arbitrary step sizes.

In this embodiment, the color signal conversion methods can be selected. The user can select the accuracy priority or speed priority color conversion process using the user interface shown in FIG. 10 in correspondence with the image to be printed and work contents.

Sixth Embodiment

A color signal conversion apparatus according to the sixth embodiment of the present invention will be described below. The same reference numerals in this embodiment denote the same parts as those in the fifth embodiment, and a detailed description thereof will be omitted.

Upon completion of the aforementioned calibration, image data is loaded onto the main memory 1102 and that image is displayed on the color monitor 1107 in accordance with user instruction. After that, when the user issues a command to print the image displayed on the color monitor 1107, i.e., the RGB image data held in the main memory 1102, the CPU 1101 asks the user an important color using a user interface shown in FIG. 17.

The user can designate the central value of the important color by L*, a*, and b* values, and can also designate its neighboring range by ΔE. The user can designate a plurality of important colors. Based on the designated important color, a color conversion process is done in the processing accuracy priority mode within the neighboring range of the important color, and is done in the processing speed priority mode outside the neighboring range.

Figure 18:
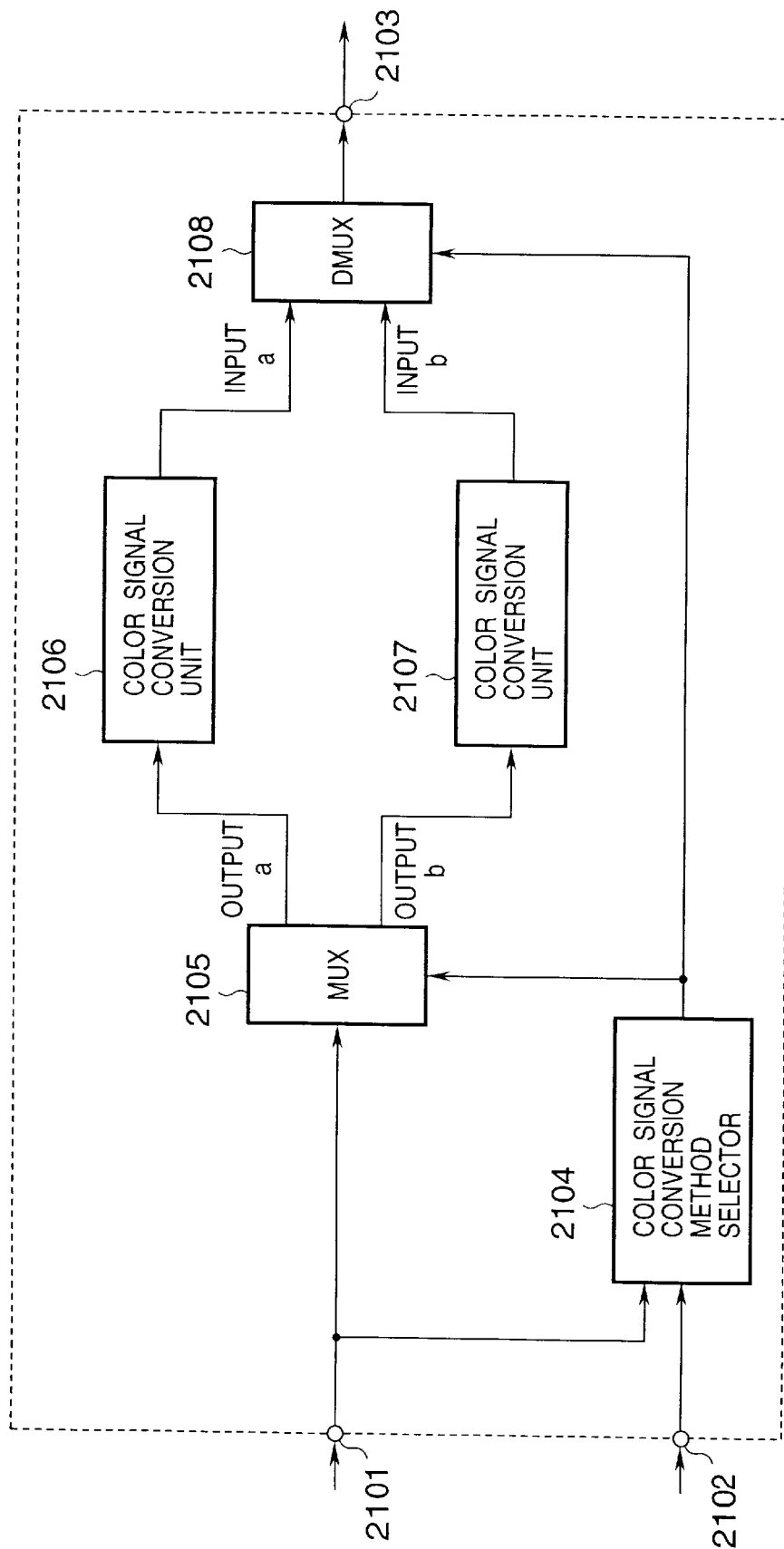
FIG. 18 is a block diagram showing the functional arrangement for implementing a conversion algorithm from Lab color space expression into CMY color space expression.

FIG. 18 is a block diagram showing the functional arrangement that implements the conversion algorithm from Lab color signal expression into CMY color signal expression.

Referring to FIG. 18, an Lab color signal as a conversion source of the conversion process is input from a terminal 2101, and a CMY color signal as a conversion result is output from a terminal 2103. An important color designation result by the user is input from a terminal 2102.

A color signal conversion method selector 2104 stores the important color designation result, and outputs a multiplex/demultiplex signal in correspondence with the value of an Lab color signal input to the terminal 2101. FIG. 19 shows the output condition of the multiplex/demultiplex signal. That is, when the value of the Lab color signal input from the terminal 2101 has a value in the vicinity of one of the important colors, a signal b is output as a multiplex/demultiplex signal; otherwise, a signal a is output as a multiplex/demultiplex signal.

A multiplexer (MUX) 2105 multiplexes the Lab color signal input from the terminal 2101 in accordance with the multiplex signal, and outputs the multiplexed signal to a color signal converter 2106 or 2107. The color signal converter 2106 converts an Lab color signal into a CMY color signal by the aforementioned steepest descent algorithm. The color signal conversion unit 2107 converts an Lab color signal into a CMY color signal by the aforementioned full-search algorithm. A demultiplexer (DMUX) 2108 demultiplexes the outputs from the color signal conversion units 2106 and 2107 in accordance with a demultiplex signal and outputs a CMY color signal to the terminal 2103.

FIGS. 13 and 14 respectively show the relationship between the multiplex signal (selection signal) and the multiplexed output of the MUX 2105, and the relationship between the demultiplex signal (selection signal) and the demultiplexed output of the DMUX 2108. That is, a color signal is converted by the color signal conversion unit 2107 for the important color and its neighboring range that require high processing accuracy; a color signal is converted by the color signal conversion unit 2107 for a color other than the important color that requires high processing speed.

The color signal conversion units 2106 and 2107 respectively have the same arrangements as those of the color signal conversion units 1406 and 1407 in the fifth embodiment, and perform the same operations.

In this embodiment, the color signal conversion method can be selected in correspondence with the color signal value. The user can designate the color (important color) for which high processing accuracy is required as first priority and its neighboring range using the user interface shown in FIG. 17 in accordance with the color image to be printed and work contents. Hence, the required accuracy is maintained for the important color, and the processing time is shortened for colors other than the important color and its neighboring range.

The important color and its neighboring range (color range contained in the important color) designated by the user can be stored in a storage medium such as the HDD 1105 by appending an index thereto. In this way, the user can easily read out the previously designated important color and its neighboring range on the basis of the index by operating the keyboard 1111 and mouse 1112 without designating them every time.

As described above, according to the aforementioned embodiments, a signal in a given color space can be converted into that in another color space with high accuracy and within a short period of time, without preparing any inverse conversion data.

Also, as can be seen from the descriptions of the fifth and sixth embodiments, the color signal conversion methods can be switched, and the user can select which one of the color processing accuracy and speed has priority. When the color signal conversion method is switched to a specific color, the processing time can be shortened while maintaining practically required color processing accuracy.

That is, in a DTP or CAD works, since the user can switch the color signal conversion method, he or she can select which one of the color processing accuracy and speed has priority. For example, by exploiting this selection function, when a color signal conversion method which has relatively low color processing accuracy but high processing speed is used in the initial stage of the work, and a color signal conversion method which requires long processing time but assures high color processing accuracy is used in the last stage of the work, both a satisfactory color reproduction result and short work time can be achieved.

In addition, when a color signal conversion method which assures high color processing accuracy is used for color to which the human being is sensitive, and a color signal conversion method which has relatively low color processing accuracy but high processing speed is used for color to which the human being is not sensitive, the processing time can be shortened while substantially maintaining high color processing accuracy.

In this way, the present invention has an effect of improving the efficiency of DTP and CAD works.

Other Embodiment

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (Operating System) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for converting an input signal in first color space into an output signal in second color space which is different from the first color space, said apparatus comprising:

a converter, arranged to convert a provided signal in the second color space into a signal in the first color space;

an extractor, arranged to extract a difference between the signal output by said converter and the input signal; and a searcher, arranged to search a signal to be provided to said converter to minimize the extracted difference by repeating a process which generates a multi-dimensional scalar field in the second color space based on the extracted difference, acquires a gradient at a search point from the generated scalar field, and updates the search point to lower a potential of the scalar field based on the acquired gradient, so as to search for a signal that minimizes the difference.

2. The apparatus according to claim 1, wherein said searcher calculates an amount of change in search point upon updating the search point from a potential amount of the scalar field at the search point.

3. The apparatus according to claim 1, wherein said searcher probabilistically adds an amount of change to the search point when the number of times of repetition of the process has reached a predetermined value and a potential amount of the scalar field at the search point is larger than a predetermined amount.

4. The apparatus according to claim 3, wherein said searcher probabilistically determines amounts of change in units of direction components of a vector to be added upon probabilistically adding the amount of change to the search point.

5. The apparatus according to claim 1, wherein said searcher probabilistically adds an amount of change to the search point when a potential amount of the scalar field at the search point is larger than a predetermined amount, and a probability condition for the number of times of repetition of the process satisfies a predetermined condition.

6. The apparatus according to claim 5, wherein said searcher probabilistically determines a direction of a vector to be added, and obtains a magnitude of the vector from the number of times of repetition of the process upon probabilistically adding the amount of change to the search point.

7. The apparatus according to claim 1, wherein the output signal indicates a searching result of said searcher.

8. The apparatus according to claim 1, wherein said extractor extracts a distance weighted in an orthogonal coordinate system as the difference.

9. The apparatus according to claim 1, wherein said extractor extracts a distance weighted in a cylindrical coordinate system as the difference.

10. An image processing apparatus for converting an input signal in first color space into an output signal in second color space which is different from the first color space, said apparatus comprising:

a converter, arranged to convert a provided signal in the second color space into a signal in the first color space;

an extractor, arranged to extract a difference between the signal output by said converter and the input signal;

a first searcher, arranged to search a signal to be provided to said converter to minimize the extracted difference; and a second searcher, arranged to search a signal in the vicinity of the signal searched by said first searcher to minimize the extracted difference, wherein said first searcher repeats a process for generating a multi-dimensional scalar field in the second color space based on the extracted difference, acquiring a gradient at a search point from the generated scalar field, and updating the search point to lower a potential of the scalar field based on the acquired gradient, so as to search for a signal that minimizes the difference, and said second searcher repeats a process for updating the search point to a point having a smaller difference when the difference acquired at least at one point in the neighborhood of the search point is smaller than the difference at the search point so as to search for signal that minimizes the difference.

11. The apparatus according to claim 10, wherein said first searcher probabilistically adds an amount of change to the search point when the number of times of repetition of the process has reached a predetermined value and a potential amount of the scalar field at the search point is larger than a predetermined amount.

12. The apparatus according to claim 11, wherein said first searcher probabilistically determines amounts of change in units of direction components of a vector to be added upon probabilistically adding the amount of change to the search point.

13. The apparatus according to claim 10, wherein said first searcher probabilistically adds an amount of change to the search point when a potential amount of the scalar field at the search point is larger than a predetermined amount, and a probability condition for the number of times of repetition of the process satisfies a predetermined condition.

14. The apparatus according to claim 13, wherein said first searcher probabilistically determines a direction of a vector to be added, and obtains a magnitude of the vector from the number of times of repetition of the process upon probabilistically adding the amount of change to the search point.

15. The apparatus according to claim 10, wherein the output signal indicates a searching result of said second searcher.

16. The apparatus according to claim 10, wherein said extractor extracts a distance weighted in an orthogonal coordinate system as the difference.

17. The apparatus according to claim 10, wherein said extractor extracts a distance weighted in a cylindrical coordinate system as the difference.

18. An image processing method for converting an input signal in first color space into an output signal in second color space which is different from the first color space, said method comprising:

a conversion step, of converting a provided signal in the second color space into a signal in the first color space;

an extraction step, of extracting a difference between the signal output in said conversion step and the input signal;

a search step, of searching a signal to be provided to said conversion step to minimize the extracted difference;

a generate step, of generating a multi-dimensional scalar field in the second color space based on the extracted difference;

an acquire step, of acquiring a gradient at a search point from the generated scalar field;

an update step, of updating the search point to lower a potential of the scalar field based on the acquired gradient; and a repeat step, of repeating the generate, acquire and update steps so as to search for a signal that minimizes the difference.

19. An image processing method for converting an input signal in first color space into an output signal in second color space which is different from the first color space, said method comprising the steps of:

a conversion step, of converting a provided signal in the second color space into a signal in the first color space;

an extraction step, of extracting a difference between the signal output in said conversion step and the input signal;

a first search step, of searching a signal to be provided to the conversion step to minimize the extracted difference; and a second search step, of searching a signal in the vicinity of the signal searched in the first searching step to minimize the extracted difference, wherein the first search step comprises:

a generate step, of generating a multi-dimensional scalar field in the second color space on the basis of the extracted difference;

an acquire step, of acquiring a gradient at a search point from the generated scalar field, an update step, of updating the search point to lower a potential of the scalar field so as to search for a signal that minimizes the difference; and a repeat step, of repeating the generate, acquire and update steps so as to search for a signal that minimizes the difference; and in the second search step, a process for updating the search point to a point having a smaller difference when the difference acquired at least at one point in the neighborhood of the search point is smaller than the difference at the search point is repeated so as to search for a signal that minimizes the difference.

20. A computer readable storage medium storing a computer program for an image processing method for converting an input signal in first color space into an output signal in second color space which is different from the first color space, said computer program comprising:

code for a conversion step, of converting a provided signal in the second color space into a signal in the first color space;

code for an extraction step, of extracting a difference between the signal output in said conversion step and the input signal; and code for a search step, of searching a signal to be provided to said conversion step to minimize the extracted difference, code for a generate step, of generating a multi-dimensional scalar field in the second color space based on the extracted difference;

code for an acquire step, of acquiring a gradient at a search point from the generated scalar field; and code for a repeat step, of repeating a process for updating the search point to a lower potential of the scalar field, so as to search for a signal than minimizes the difference.

21. A computer readable storage medium storing a computer program for an image processing method for converting an input signal in first color space into an output signal in second color space which is different from the first color space, said computer program comprising:

code for a conversion step, of converting a provided signal in the second color space into a signal in the first color space;

code for an extraction step, of extracting a difference between the signal output in said conversion step and the input signal;

code for a first search step, of searching a signal to be provided to said conversion step to minimize the extracted difference; and code for a second search step, of searching a signal in the vicinity of the signal searched in said first search step to minimize the extracted difference, wherein the code for the first search step comprises:

code for a generate step, of generating a multi-dimensional scalar field in the second color space on the basis of the extracted difference;

code for an acquire step, of acquiring a gradient at a search point from the generated scalar field;

code for an update step, of updating the search point to lower a potential of the scalar field based on the acquired gradient; and code for a repeat step, of repeating the generate, acquire, and update steps so as to search for a signal that minimizes the difference; and in the second search step, a process for updating the search point to a point having a smaller difference when the difference acquired at least at one point in the neighborhood of the search point is smaller than the difference at the search point is repeated so as to search for a signal that minimizes the difference.

* * * * *

UNITED STATES PATENT AND TRADEMARK OFFICE
CERTIFICATE OF CORRECTION

PATENT NO. : 6,633,667 B1
DATED : October 14, 2003
INVENTOR(S) : Hirochika Matsuoka It is certified that error appears in the above-identified patent and that said Letters Patent is hereby corrected as shown below:

<u>Title page,</u>
Item [56], References Cited, U.S. PATENT DOCUMENTS, insert:
-- 6,229,915   5/2001   Ohkuba --.

<u>Column 5,</u>
Formula (1), " $\Delta E \sqrt{L1 - L2)_2 + (a1 - a2)_2 + (b1 - b2)^2}$ " should read -- $\Delta E \sqrt{(L1 - L2)^2 + (a1 - a2)^2 + (b1 - b2)^2}$ --

Line 44, "number)" should read -- number). --; and
Line 67, "0≦b≦Rb}" should read -- 0≦b≦Rb}. --.

<u>Column 6,</u>
Line 34, "number" should read -- number. --;
Formula "if $(x \geq 1)I(x)\sqrt{x}$;" should read -- if $(x \geq 1)I(x) = \sqrt{x}$; --; and
Line 59, "invention." should read -- invention will be described below. --.

<u>Column 7,</u>
Line 12, "if" should read -- If --.

<u>Column 8,</u>
Line 33, "normal" should read -- norm --;

Formula 6, "
$$\left. \begin{array}{l} C1 = \sqrt{a1^2 + b1^2} \\ if(0 \leq b1)H1 - \cos^{-1}(a1/C1); \\ else\, H1 = -\cos^{-1}(a1/C1); \end{array} \right\}$$
" should read --
$$\left. \begin{array}{l} C1 = \sqrt{a1^2 + b1^2} \\ if(0 \leq b1)H1 = \cos^{-1}(a1/C1); \\ else\, H1 = -\cos^{-1}(a1/C1); \end{array} \right\}$$
--; and Line 59, "and" should read -- ¶ and --.

<u>Column 9,</u>
Formula 8, "δ≦p2≦ (δ+Δδ)" should read -- δ≦p2≦ (δ+Δσ) --.

<u>Column 14,</u>
Line 10, "number)" should read -- number ). --;
Line 40, "that" should read -- That --.
Line 45, "Itr$^{num}$." should read -- Itr$_{num}$. --; and
Line 63, "0≦c <255," should read -- 0≦c ≦255, --.

UNITED STATES PATENT AND TRADEMARK OFFICE
CERTIFICATE OF CORRECTION

PATENT NO. : 6,633,667 B1
DATED : October 14, 2003
INVENTOR(S) : Hirochika Matsuoka It is certified that error appears in the above-identified patent and that said Letters Patent is hereby corrected as shown below:

Column 15,
Line 53, "asks the user an" should read -- asks the user to designate an --.

Column 17,
Line 26, "CΔD" should read -- CAD --.

Column 19,
Line 12, "signal" should read -- a signal --.

Column 20,
Line 57, "than" should read -- that --.

Signed and Sealed this

Tenth Day of August, 2004

JON W. DUDAS
*Acting Director of the United States Patent and Trademark Office*